(12) United States Patent
Chen et al.

(10) Patent No.: US 10,674,377 B2
(45) Date of Patent: Jun. 2, 2020

(54) ASSISTING COMMUNICATION DEVICE, WIRELESS ACCESS NODE AND METHOD THEREFOR

(71) Applicant: Sony Corporation, Tokyo (JP)

(72) Inventors: Jinhui Chen, Beijing (CN); Chen Sun, Beijing (CN); Xin Guo, Beijing (CN); Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/188,413

(22) Filed: Jun. 21, 2016

(65) Prior Publication Data

US 2017/0013480 A1   Jan. 12, 2017

(30) Foreign Application Priority Data

Jul. 7, 2015 (CN) .......................... 2015 1 0394013

(51) Int. Cl.
  *H04W 24/02* (2009.01)
  *H04W 92/20* (2009.01)
  *H04W 88/08* (2009.01)
(52) U.S. Cl.
  CPC ............ *H04W 24/02* (2013.01); *H04W 88/08* (2013.01); *H04W 92/20* (2013.01)
(58) Field of Classification Search
  CPC . H04W 24/02; H04W 74/00–74/0891; H04W 88/08; H04W 92/20
  See application file for complete search history.

(56) References Cited

U.S. PATENT DOCUMENTS

| | | | | |
|---|---|---|---|---|
| 2009/0122782 A1* | 5/2009 | Horn | ...................... | H04J 3/0679 370/350 |
| 2009/0196277 A1* | 8/2009 | Horn | ...................... | H04J 3/0679 370/350 |
| 2011/0312316 A1* | 12/2011 | Baldemair | .............. | H04L 5/001 455/422.1 |
| 2013/0308626 A1* | 11/2013 | Feng | ...................... | H04J 3/0638 370/350 |
| 2014/0177546 A1* | 6/2014 | Kang | ........................ | H04L 5/06 370/329 |
| 2015/0195841 A1* | 7/2015 | Lorca Hernando | ......................... | H04W 72/082 370/329 |
| 2015/0296466 A1* | 10/2015 | Takano | ............... | H04W 72/042 370/350 |

(Continued)

*Primary Examiner* — Raymond S Dean
(74) *Attorney, Agent, or Firm* — Xsensus LLP

(57) ABSTRACT

The present disclosure provides an assisting communication device and method, a wireless access node and a method for a wireless access node. The assisting communication device includes: an adjacent access nodes information acquiring unit, configured to detect, based on configuration information from a wireless access node assisted by the assisting communication device, at least one adjacent access node, to acquire working parameters of the adjacent access nodes, the configuration information including an indication about at least one of a detecting type, a detecting object and a detecting result report; and a notification unit, configured to report the acquired working parameters of the adjacent access nodes to the wireless access node assisted by the assisting communication device, to be served as a configuration reference of the wireless access node so as to avoid conflict with the adjacent access nodes.

18 Claims, 5 Drawing Sheets

(56) References Cited

U.S. PATENT DOCUMENTS

2016/0007247 A1* 1/2016 Lee .................. H04W 36/0066
370/331

* cited by examiner

ASSISTING COMMUNICATION DEVICE, WIRELESS ACCESS NODE AND METHOD THEREFOR

FIELD OF THE INVENTION

The embodiments of the present invention generally relate to the field of wireless communications, and particularly relate to a device and a method for avoiding mutual interferences between adjacent access nodes by an assisting communication manner. More particularly, the embodiments of the present invention relate to an assisting communication device and method, a wireless access node and a method for a wireless access node.

BACKGROUND OF THE INVENTION

In wireless communication systems nowadays, some access nodes which are actually adjacent to each other in location do not share their respective access configuration information. These access nodes are for example base stations belonging to different operators, or access nodes based on different communication protocols. Due to unavailability of the configuration information or working parameters of the other access nodes, there is possibility that adjacent access nodes interfere with each other, thereby degrading the communication quality. In addition, it is difficult for the access nodes which are of the property of being mobile and incident, or the access nodes of different wireless communication systems to perform complete and direct configuration information interchange therebetween.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, there is provided a an assisting communication device, including: an adjacent access nodes information acquiring unit, configured to detect, based on configuration information from a wireless access node assisted by the assisting communication device, at least one adjacent access node, to acquire working parameters of the adjacent access nodes, the configuration information including an indication about at least one of a detecting type, a detecting object and a detecting result report; and a notification unit, configured to report the acquired working parameters of the adjacent access nodes to the wireless access node assisted by the assisting communication device, to be served as a configuration reference of the wireless access node so as to avoid conflict with the adjacent access nodes.

According to another aspect of the present application, there is further provided a wireless access node, including: an assisting configuration unit, configured to generate configuration information for controlling an assisting communication device of the wireless access node to detect at least one adjacent access node, the configuration information including an indication about at least one of a detecting type, a detecting object and a detecting result report; and a working parameter configuration unit, configured to configure, based on working parameters of the adjacent access nodes reported by the assisting communication device, working parameters of the wireless access node to avoid conflict with the adjacent access nodes.

According to an aspect of the present invention, there is provided an assisting communication method, including: detecting, based on configuration information from the assisted wireless access node, at least one adjacent access node, to acquire working parameters of the adjacent access nodes, the configuration information including an indication about at least one of a detecting type, a detecting object and a detecting result report; and reporting the acquired working parameters of the adjacent access nodes to the assisted wireless access node, to be served as a configuration reference of the wireless access node so as to avoid conflict with the adjacent access nodes.

According to another aspect of the present application, there is provided a method for a wireless access node, including: generating configuration information for controlling an assisting communication device of the wireless access node to detect at least one adjacent access node, the configuration information including an indication about at least one of a detecting type, a detecting object and a detecting result report; and configuring, based on working parameters of the adjacent access nodes reported by the assisting communication device, working parameters of the wireless access node to avoid conflict with the adjacent access nodes.

According to other aspects of the present invention, there are further provided computer program codes and computer program product for implementing the above mentioned assisting communication method and the method for the wireless access node, as well as a computer readable storage medium on which computer program codes for realizing the aforementioned assisting communication method and the method for the wireless access node are recorded.

In the embodiments of the present application, the wireless access node acquires the working parameters of the adjacent access nodes via an assisting communication manner, and configures the working parameters of itself according to the working parameters so as to avoid conflict with the adjacent access nodes, alleviating or even eliminating the mutual interferences between adjacent access nodes without the need of direct interaction between access nodes, and improving the communication quality.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

The First Embodiment

Figure 1:
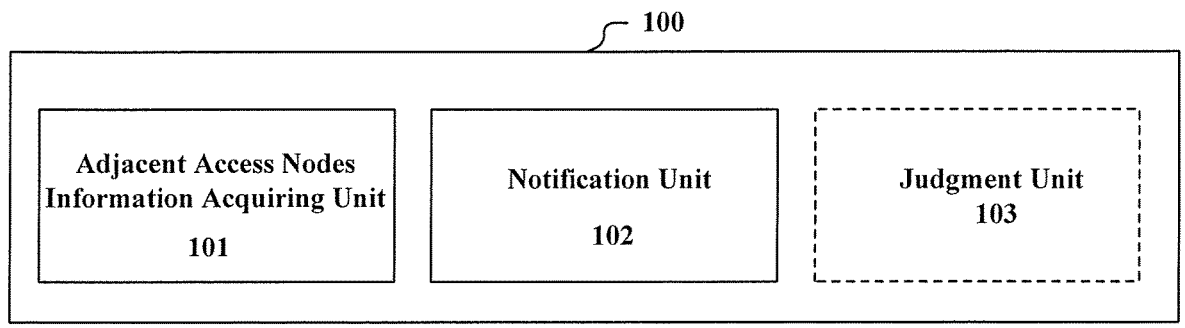
FIG. 1 is a structural block diagram illustrating the assisting communication device according to an embodiment of the present application.

FIG. 1 illustrates a structural block diagram of an assisting communication device 100 according to an embodiment of the present application. As shown in FIG. 1, the assisting communication device 100 includes: an adjacent access nodes information acquiring unit 101, configured to detect, based on configuration information from a wireless access node assisted by the assisting communication device 100, at least one adjacent access node, to acquire working parameters of the adjacent access nodes, the configuration information including an indication about at least one of a detecting type, a detecting object and a detecting result report; and a notification unit 102, configured to report the acquired working parameters of the adjacent access nodes to the wireless access node assisted by the assisting communication device 100, to be served as a configuration reference of the wireless access node so as to avoid conflict with the adjacent access nodes.

The wireless access node and the adjacent access nodes stated herein each can be, for example, a communication device (for example, a base station device such as eNB and the like, and a WiFi router) providing wireless network access service to a user device in a LTE communication system, a WiFi communication system or the like. Moreover, the wireless access node and the adjacent access node can be of the same type of communication system (for example, both of them are of the cellular system but operated by different operators), but can also be of different types of communication systems (for example, one is of the cellular system and the other is of the WiFi system). Further, the wireless access node and the adjacent access node can belong to the same operator (for example, it is also difficult for the same operator to achieve the information interchange between different types of communication systems operated by itself), but can also belong to different operators. As mentioned previously, in communication systems nowadays, it is difficult for some different access nodes to achieve configuration information interchange directly therebetween. While the assisting communication device 100 of the present application serves as an agency between the access nodes, and the information interchange between the access nodes is implemented without changing the current specification significantly and without affecting the communication of the already accessed user devices of respective access nodes. Since the access node (hereinafter as refereed as "the local access node") assisted by the assisting communication device 100 is capable of knowing the working parameters configuration of the adjacent access nodes, and thus it can adjust the working parameters configuration of itself to avoid conflict.

The assisting communication device 100 can be implemented as an additional module which is located in the assisted wireless access node, or can be implemented as a separate equipment. In the latter case, the assisting communication device 100 can for example connect with the wireless access node via a wired or wireless specific connecting manner, so as to perform interchange of related information. For example, the assisting communication device 100 can perform wireless communication with the wireless access node in a frequency band different from the frequency band where the wireless access node communicates with its user devices. Alternatively, due to the fact that the mounting location of the assisting communication device 100 can be predetermined, a high frequency/short-distance communication manner such as the microwave, infrared, blue-tooth and the like can be used to perform the wireless communication. In addition, the assisting communication device 100 can further has a wired connection with the wireless access node, so as to get more reliable information transfer.

As stated previously, the assisting communication device 100 can detect, based on the configuration of the wireless access node, information of the working status of the adjacent access nodes, and report this information to the wireless access node, thereby achieving indirect information interchange between the access nodes and reducing the occurrence of conflict.

Wherein, the detecting operation performed by the assisting communication device 100, in particular the adjacent access nodes information acquiring unit 101 can include at least one of searching, measuring, residing, accessing and listening. For example, detection of the synchronization signal or the cell identification can be implemented by cell searching, detection of the spectrum resources occupied by the adjacent access nodes can be implemented by measuring, detection of working parameters contained in the system information can be implemented by the broadcast channel listening, and detection of working parameters contained in the specific signaling such as the RRC signaling can be implemented by cell accessing. The performed detecting operation at least partially depends on the configuration information from the wireless access node. It is to be noted that, when the detecting operation is the accessing, there can be no other data interchange between the assisting communication device 100 and the adjacent access node except the signaling and the reference signal. In other words, such accessing is different from the accessing of a normal user device to the access node. In addition, the above mentioned connection of the assisting communication device 100 with its assisted wireless access node via a wired or a specific wireless connection manner is also different from the connection of a normal user device with its wireless access node.

The configuration information can include an indication about at least one of a detecting type, a detecting object and a detecting result report. Specifically, the configuration information specifies, for example, the assisting communication device is to perform which kind of detection on which access nodes and how to report the detecting results. When the configuration information does not contain the indication information of one or more items among the detecting type, the detecting object and the detecting result report, preset default settings can be adopted for the one or more items.

Wherein, the detecting type includes for example synchronization signal detecting, reference signal detecting, wireless resource detecting and the like. If the assisting communication device 100 can only perform a certain type of detecting, the information of indication about this item can be omitted in the configuration information. While the assisting communication device 100 is capable of performing multiple types of detecting, the wireless access node can configure the type of detecting to be performed currently by configuring a particular information element in the configuration information, for example.

In an example, the detecting type includes wireless resource detecting, and the assisting communication device 100 detects, in response to a wireless resource detecting indication of the wireless access node, the wireless resources occupied by the adjacent access nodes. The wireless resources include at least one of a frequency band, time and a time-frequency resource block.

In particular, the adjacent access nodes information acquiring unit 101 can detect the wireless resources frequency band occupied by the adjacent access nodes, or a schedule by which the adjacent access nodes are to occupy the wireless resources frequency band. As an example, when the detecting operation is the accessing operation, the assisting communication device 100 accesses into the adjacent access node and acquires its time-frequency resources configuration. After the notification unit 102 reports this time-frequency resources configuration to the wireless access node assisted by the assisting communication device 100, the local access node configures, according to this time-frequency resources configuration, time-frequency resources for itself, so as to avoid interferences with the adjacent access nodes. In addition, in the case that the local access node and the adjacent access node belong to different wireless communication systems, for example, the local access node is a WiFi access node and the adjacent access node is a LTE access node, when the assisting communication device 100 accesses into the adjacent access node to acquire the information of available resources of the adjacent access node and notifies the local access node of the information, the local access node can further use the available resources to communicate, for example.

In another example, the detecting type can include synchronization signal detecting, and the assisting communication device 100 detects, in response to a synchronization signal detecting indication of the wireless access node, the synchronization signals emitted by the adjacent access nodes, the synchronization signal including at least one of a primary synchronization signal (PSS) and a secondary synchronization signal (SSS).

For example, the adjacent access nodes information acquiring unit 101 can measure a signal receiving level for the synchronization signal of an adjacent access node, so that the local access node can judge, based on the measurement result, whether a synchronization signal conflict with the adjacent access node occurs, and change the synchronization signal of the local access node for example in the case of determining the occurrence of the conflict. For example, when the synchronization signal of the adjacent access node and the synchronization signal of the local access node are the same or correlated, and the signal receiving level is above a predetermined threshold, it is determined that a synchronization signal conflict occurs between the local access node and the corresponding adjacent access node.

In another example, the detecting type can include reference signal detecting, and the assisting communication device 100 detects, in response to a reference signal detecting indication of the wireless access node, the reference signals emitted by the adjacent access nodes, the reference signal including at least one of a cell-specific reference signal (CRS), a channel status information reference signal (CSI-RS) and a discovery reference signal (DRS).

For example, the adjacent access nodes information acquiring unit 101 can access an adjacent access node to acquire its reference signal configuration information, so that the local access node can judge, based on the reference signal configuration information, whether a conflict with the adjacent access node occurs, and change the reference signal of the local access node in the case of determining the occurrence of the conflict. For example, whether a conflict occurs can be determined according to a correlation degree between the reference signal of the local access node and the reference signal of the adjacent access node. For instance, if the correlation degree is higher than a certain degree, it is considered that a conflict occurs. The local access node can eliminate the conflict by adjusting the reference signal configuration. The reference signal configuration includes at least one of a reference sequence and the occupied time-frequency resources, for example. Specifically, the local access node can eliminate the conflict by changing the reference sequence (for example, adding offset), transmitting timing and the like.

Although several examples of the detecting type have been provided in the above, it should be understood that the detecting type is not limited thereto, and can be added or removed according to actual requirements. In addition, the above detecting operation can be performed with respect to all of the adjacent access nodes, or the adjacent access nodes to be detected can also be specified or limited by the indication about the detecting object in the configuration information.

In an example, the adjacent access nodes information acquiring unit 101 can detect, based on the indication about the detecting object, particular adjacent access nodes, wherein, the indication about the detecting object includes at least one of the following: identification information, synchronization signal configuration, reference signal configuration and wireless resources configuration of the adjacent wireless nodes to be detected.

For example, when the indication about the detecting object includes the synchronization signal configuration of the adjacent access nodes to be detected, only the adjacent access nodes with this synchronization signal configuration will be detected. In particular, when setting this synchronization signal configuration to be the synchronization signal configuration of the local access node, only the adjacent access nodes which conflict with the local access node will be detected. In addition, it can also be set to detect only the adjacent access nodes operating in a certain frequency band.

In an example, the synchronization signal configuration, the reference signal configuration or the wireless resources configuration of the adjacent wireless nodes to be detected conflicts with the configuration for the wireless access node assisted by the assisting communication device 100. The configuration for the wireless access node includes the configuration under use currently or the configuration planned to be used. In this situation, only the adjacent access nodes with the configuration conflicting with that of the local access node are detected.

In addition, it is also possible to set an identification bit in the configuration information to denote the indication of the detecting object. For example, when the identification bit has a certain value, the configuration of the local access node is taken as the configuration of the adjacent access nodes to be detected.

After the adjacent access nodes information acquiring unit 101 finishes corresponding detecting according to the configured detecting type of detecting object, the notification unit 102 reports the acquired working parameters to the local access node. As stated previously, the notification unit 102 can report the wireless resources detecting results, the synchronization signal detecting results, the reference signal detecting results and so on to the local access node.

In an example, the reporting content, reporting triggering condition and so on of the notification unit 102 can be configured by the indication about the detecting result report in the configuration information.

For example, the adjacent access nodes information acquiring unit 101 is configured to measure a signal receiving level of the assisting communication device 100 with respect to an adjacent access node. As shown by a dotted line block in FIG. 1, the assisting communication device 100 further includes a judgment unit 103, configured to judge whether the signal receiving level satisfies a predetermined condition, and in the case of satisfying the predetermined condition, to control the notification unit 102 to report the working parameters of the corresponding adjacent access node to the wireless access node assisted by the assisting communication device 100. The predetermined condition is contained for example in the indication about the detecting result report in the configuration information. For example, the predetermined condition is the intensity being larger than a threshold, or the first N of all the measurement results ranked by the intensity, and so on.

Exemplarily, when the configuration information instructs the assisting communication device 100 to detect the adjacent access nodes which use the same synchronization signal as that of the local access node, if an adjacent access node whose signal receiving level is above the predetermined threshold is detected, the notification unit 102 reports the working parameters of this adjacent access node to the local access node. In addition, the adjacent access nodes information acquiring unit 101 further detects other possible synchronization signals to record their receiving levels, and reports the signal receiving levels of all the detected synchronization signals to the local access node. For example, the local access node can select a suitable synchronization signal as an object to change to, according to these signal receiving levels. As stated previously, the notification unit 102 can connect with the local access node via a wired communication manner or a short-distance communication manner (such as microwave, infrared, blue-tooth and the like).

In the case that the assisting communication device is not contained in the wireless access node, the assisting communication device 100 can be provided at a position the same as or proximate to the position of the wireless access node. For example, the degree of proximity should meet the condition that the measurement result of the assisting communication device 100 is equivalent to the measurement result by the wireless access node itself. It is to be understood that, the signal intensity measured by the assisting communication device proximate to the wireless access node in location is of more significance, and requires no conversion by the wireless access node. In addition, the position setting of the assisting communication device can simulate the distribution of user devices, or be properly set according to the application environment, but not limited thereto.

As stated above, the assisting communication device 100 can trigger the detecting operation based on the receiving of the configuration information. The configuration information can be transmitted for example periodically by the wireless access node, or can be transmitted when satisfying a predetermined condition such as the communication quality degrading to a certain degree. In addition, in the configuration information, the period for the assisting communication device 100 to perform detecting can also be specified, so that he assisting communication device 100 performs detecting automatically according to this period.

In addition, although not shown in FIG. 1, the assisting communication device 100 can further includes a synchronization information acquiring unit, configured to synchronize with an adjacent access node and acquire the synchronization information with it, such as the synchronization information in frequency and time. The assisting communication device 100 notifies the local access node of the synchronization information, so that the local access node synchronizes with the adjacent access nodes according to the synchronization information. When synchronization operation is performed among multiple access nodes, the synchronization time points can be staggered in time according to a certain rule, to ensure that the multiple access nodes achieve full synchronization in order. The rule is for example determining the synchronization executing timing according to the identification of the access nodes.

In this embodiment, the assisting communication device 100 detects, based on the configuration information from the wireless access node, the relevant adjacent access nodes to acquire their working parameters, so that the wireless access node can configure, based on the acquired working parameters of the adjacent access nodes, the working parameter of itself in a conflict-avoiding manner, improving the communication quality.

The Second Embodiment

Figure 2:
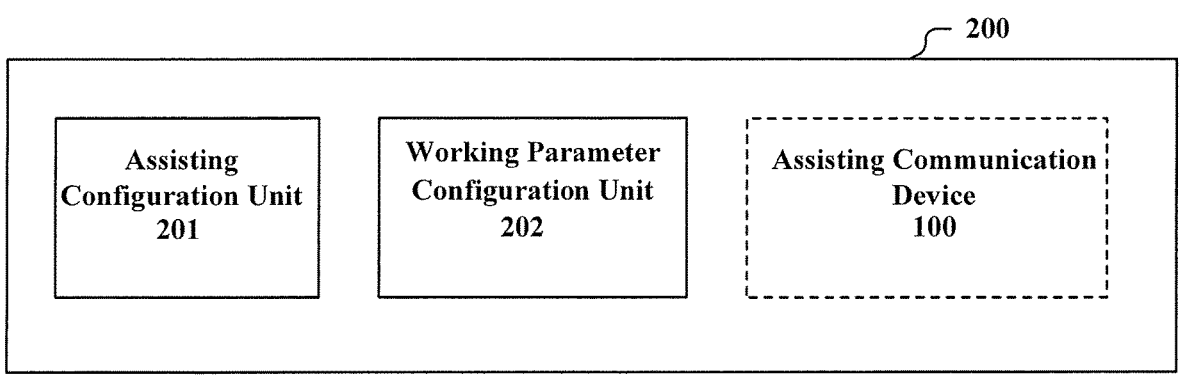
FIG. 2 is a structural block diagram illustrating the wireless access node according to an embodiment of the present application.

FIG. 2 illustrates a structural block diagram of a wireless access node 200 according to an embodiment of the present application. As shown in FIG. 2, the wireless access node 200 includes: an assisting configuration unit 201, configured to generate configuration information for controlling an assisting communication device of the wireless access node to detect at least one adjacent access node, the configuration information including an indication about at least one of a detecting type, a detecting object and a detecting result report; and a working parameter configuration unit 202, configured to configure, based on working parameters of the adjacent access nodes reported by the assisting communication device, working parameters of the wireless access node to avoid conflict with the adjacent access nodes.

As stated above, the wireless access node 200 can connect to the assisting communication device via a wired communication manner or a short-distance wireless communication manner. In addition, as shown by a dotted line block in FIG. 2, the wireless access node 200 can further include an assisting communication device 100 to acquire the assistance of the assisting communication device 100.

Wherein, the assisting configuration unit 201 generates the configuration information for configuring the assisting communication device to detect the adjacent access nodes. The assisting communication device performs detecting according to the configuration information, and reports the acquired working parameters of the adjacent access nodes to the wireless access node 200. The working parameter configuration unit 202 configures, according to the working parameters, the working parameters of the wireless access node 200 to avoid conflict with the adjacent access nodes.

For example, similar to the first embodiment, the detecting type includes at least one of the wireless resource detecting, reference signal detecting and synchronization signal detecting, to indicate the assisting communication device to perform corresponding detecting. The indication about the detecting object includes at least one of the following: identification information, synchronization signal configuration, reference signal configuration and wireless resources configuration of the adjacent wireless nodes to be detected. As an example, the synchronization signal configuration, the reference signal configuration or the wireless resources configuration of the adjacent wireless nodes to be detected can conflict with the configuration for the wireless access node. In this way the adjacent access nodes which are most likely to conflict with the local access node can be detected. In addition, the indication about the detecting object can further include for example the type of the adjacent access nodes to be detected (such as a normal LTE access node, a LAA access node based on licensed assistance access, and a WiFi access node). For example, in an example where the wireless access node 200 includes a multi-mode/multi-frequency communication module such as a LTE communication module and a WiFi communication module (not shown in the figures), the assisting communication device 100 selects, based on the WiFi access node indicated by the detecting object contained in the configuration information, to use the WiFi communication module to perform detecting.

In an example, the indication about the detecting result report includes a restricting condition on a signal receiving level for the adjacent access nodes reported by the assisting communication device, and the working parameter configuration unit 202 takes the adjacent access nodes reported by the assisting communication device as possible conflicted adjacent access nodes. Specifically, the indication about the detecting result report can define that only the adjacent access nodes with a signal receiving level higher than a predetermined threshold or the first n adjacent access nodes ranked by the signal receiving level will be reported, since these adjacent access nodes have higher possibility of conflicting with the local access node.

Of course, the indication about the detecting result report can also have no restriction, and the assisting communication device reports all the detecting results to the wireless access node 200.

The working parameter configuration unit 202 is configured to configure at least one of the wireless resources, the reference signal and the synchronization signal of the wireless access node 200 to be different from the corresponding working parameters of the adjacent access nodes reported by the assisting communication device. In this way, the conflict between the wireless access node 200 and the adjacent access nodes can be effectively avoided. The working parameter configuration unit 202 can also configure at least one of the wireless resources, the reference signal and the synchronization signal of the wireless access node 200 in a way that makes the interferences between the wireless access node 200 and the adjacent access nodes small.

In an example, in the case that the wireless access node 200 has been working in accordance with particular working parameters and the particular working parameters conflict with the corresponding working parameters of the adjacent access nodes reported by the assisting communication device, the working parameter configuration unit 202 is configured to change the particular working parameters, so as to avoid the conflict with the adjacent access nodes.

For example, when the configuration information indicates the detecting of the synchronization signal, the assisting communication device reports the detected signal receiving levels of the synchronization signal for the adjacent access nodes to the wireless access node 200. When there exists an adjacent access node which uses the same or correlated synchronization signal as the wireless access node 200 and the signal receiving level thereof is higher than the predetermined threshold, the working parameter configuration unit 202 determines that if the wireless access node 200 uses this synchronization signal a synchronization signal conflict will occur. Thus, the synchronization signal of the wireless access node 200 can be changed for example by adding an offset, to avoid conflict.

In addition, the wireless access node 200 stops transmitting signals related to the detecting of the assisting communication device to communication devices served by the wireless access node 200, when the assisting communication device detects the adjacent wireless access nodes. By doing so, the detecting of the assisting communication device can be prevented from being interfered. The wireless access node 200 can further transmit an indication about stopping transmitting particular signals to the communication devices served by the wireless access node 200. By doing so, the communication devices can be prevented from executing incorrect measurements. For example, when the assisting communication device performs detecting of the synchronization signal with respect to the adjacent access nodes, the wireless access node 200 can configure its synchronization signal to be emitted with zero power, and notify the communication devices which have been accessed into the present access node of not implementing synchronization in this subframe.

The wireless access node 200 can further notify the communication devices served by the wireless access node 200 of the change of the working parameters before changing the particular working parameters. For example, when the working parameter configuration unit 202 determines that the synchronization signal of the wireless access node 200 is to be changed, the wireless access node 100 notifies the communication devices already accessed of this change.

As a specific example, the following assumptions are made: the physical cell identification (PCI) of the wireless access node 200 is PCI0, the serial number of the corresponding primary synchronization signal PSS0 is i_PSS0=mod(PCI0, 3), and N user devices have accessed into this wireless access node. The wireless access node 200 transmits the configuration information to the assisting communication device periodically, so as to trigger its detecting of the adjacent access nodes. Alternatively, the wireless access node can notify the assisting communication device of the period to perform detecting, and the assisting communication device automatically performs detecting according to this setting of period. During the detecting of the assisting communication device, the primary synchronization signal PSS0 of the wireless access node is emitted in zero power, and the user devices do not synchronize when the primary synchronization signal is emitted in zero power.

For example, in this example, in the configuration information, the detecting type is the synchronization signal detecting, the detecting object is the adjacent access nodes which also use the primary synchronization signal PSS0, and a predetermined threshold is defined in the detecting result report. This means that the assisting communication device will perform the synchronization signal measurement with respect to the adjacent access nodes using the primary synchronization signal PSS0, and report when the signal receiving level exceeds the set predetermined threshold. Specifically, the wireless access node 200 can contain the serial number i_PSS0 of its used primary synchronization signal and the predetermined threshold corresponding to PSS0 in the configuration information to transmit to the assisting communication device. When the assisting communication device detects an adjacent access node which uses the primary synchronization signal PSS0 and the signal receiving level exceeds the above mentioned predetermined threshold, it detects other possible primary synchronization signals and records the signal receiving levels. Then, the assisting communication device reports all the measured receiving levels of the primary synchronization signals to the wireless access node. The wireless access node determines whether to change the primary synchronization signal according to the received report. If it is determined to change, the wireless access node selects, from among all the candidate primary synchronization signals, a primary synchronization signal PSS1 with the lowest corresponding signal receiving level from the adjacent access nodes as the object to change to. Subsequently, the wireless access node notifies its user devices that the primary synchronization signal is changed to the primary synchronization signal PSS1 from the time T0.

In addition, the wireless access node can further change PCI, in particular, change the original PCI from PCI0 to PCI1, which is corresponding to PSS1 and the original secondary synchronization signal SSS0. In this case, the wireless access node notifies its user devices that the PCI is changed to PCI1 and the primary synchronization signal is changed to PSS1 from the time T0.

Similarly, when the configuration information indicates the detecting of the reference signal, the assisting communication device reports the detected reference signal configuration information of the adjacent access nodes to the wireless access node 200. When the correlation degree between the reference signal of an adjacent access node and the reference signal of the wireless access node 200 is higher than a certain degree, the working parameter configuration unit 202 determines that the use of this reference signal will cause a reference signal conflict, and thus changes the reference signal of the wireless access node 200 for example by the manner of changing the reference sequence, the transmitting tune and the like.

When the working parameter configuration unit 202 determines that the reference signal of the wireless access node 200 is to be changed, the wireless access node 200 can notify the communication devices already access into the present access node of this change, for example by a high level signaling (such as RRC signaling) or the physical control channel.

When the configuration information indicates the detecting of the wireless resources, the assisting communication device detects for example the wireless resources frequency band occupied by an adjacent access node, or the schedule by which the adjacent access node is to occupy the wireless resources frequency band, and reports to the wireless access node 200. The working parameter configuration unit 202 configures the time-frequency resources to be occupied by the wireless access node based on the reported information, for example, to keep away from the time-frequency resource blocks to be occupied by the adjacent access node to avoid conflict.

In another example, the wireless access node 200 and the adjacent access node belong to different wireless communication systems, for example, the wireless access node 200 is a WiFi access node and the adjacent access node is a LTE access node. When the assisting communication device acquires the information of available resources of an adjacent access node by accessing into the adjacent access node and notifies the wireless access node 200, the wireless access node 200 can further perform communication for example using the available resources.

In addition, although not shown in FIG. 2, the wireless access node 200 can further include a synchronization unit, configured to synchronize with an adjacent access node in frequency and time, based on the synchronization information of frequency and time of the adjacent access node acquired by the assisting communication device. As stated above, the assisting communication device synchronizes with the adjacent access node to acquire the synchronization information and tells the wireless access node 200 this synchronization information. The wireless access node 200 synchronizes with the adjacent access node with this synchronization information. When synchronization operation is performed among multiple access nodes, the synchronization time points can be staggered in time according to a certain rule, to ensure that the multiple access nodes achieve full synchronization in order. For example, the wireless access node 200 can determine the synchronization executing timing according to the identification of the access nodes.

In this embodiment, the wireless access node 200 instructs, by the configuration information, the assisting communication device to detect the adjacent access nodes to acquire their working parameters, and configures, based on these working parameters, the working parameter of itself, avoiding conflict effectively and improving the communication quality.

The Third Embodiment

It is apparent that some processing or methods are also disclosed in the description above on the assisting communication device and the wireless access node according to embodiments of the present invention. Below, the summary of the methods is described without repeating the details which are already discussed above, however, it should be noted that although disclosed in the description of the assisting communication device and the wireless access node, the methods do not certainly employ or are not certainly executed by the aforementioned components. For instance, embodiments of the assisting communication device and the wireless access node may be partially or completely achieved by hardware and/or firmware, and the method described below may be fully achieved by a computer-executable program, although the methods may employ the hardware and/or firmware of the assisting communication device and the wireless access node.

Figure 3:
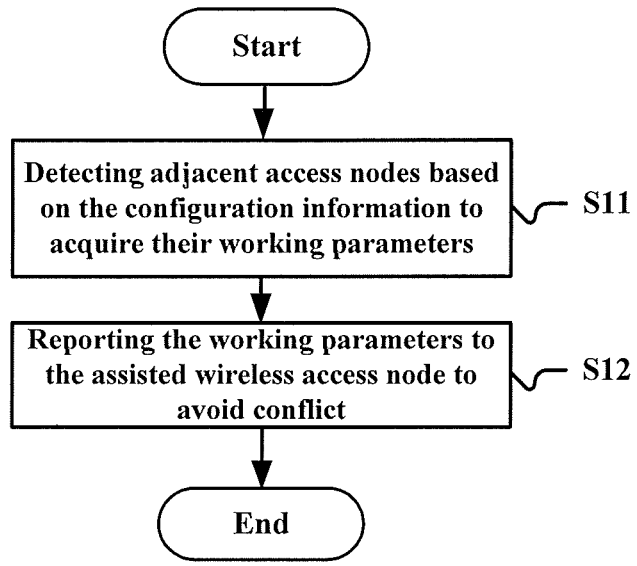
FIG. 3 is a flowchart illustrating the assisting communication method according to an embodiment of the present application.

FIG. 3 illustrates a flowchart of the assisting communication method according to an embodiment of the present application. As shown in FIG. 3, the method includes: detecting, based on configuration information from the assisted wireless access node, at least one adjacent access node, to acquire working parameters of the adjacent access nodes (S11), the configuration information including an indication about at least one of a detecting type, a detecting object and a detecting result report; and reporting the acquired working parameters of the adjacent access nodes to the assisted wireless access node, to be served as a configuration reference of the wireless access node so as to avoid conflict with the adjacent access nodes (S12).

In an example, the detecting type includes wireless resource detecting, and in the step S11, in response to a wireless resource detecting indication of the wireless access node, the wireless resources occupied by the adjacent access nodes are detected. The wireless resources include at least one of a frequency band, time and a time-frequency resource block.

The detecting type can further include reference signal detecting, and in the step S11, in response to a reference signal detecting indication of the wireless access node, the reference signals emitted by the adjacent access nodes are detected. The reference signal includes at least one of a cell-specific reference signal (CRS), a channel status information reference signal (CSI-RS) and a discovery reference signal (DRS).

In addition, the detecting type can further include synchronization signal detecting, and in the step S11, in response to a synchronization signal detecting indication of the wireless access node, the synchronization signals emitted by the adjacent access nodes are detected. The synchronization signal includes at least one of a primary synchronization signal and a secondary synchronization signal.

The step S11 can be performed with respect to all the adjacent access nodes, and can also be performed with respect to particular adjacent access nodes. For example, in step S11, the particular adjacent access nodes are detected based on the indication about the detecting object. The indication about the detecting object includes at least one of the following: identification information, synchronization signal configuration, reference signal configuration and wireless resources configuration of the adjacent wireless nodes to be detected. In an example, the synchronization signal configuration, the reference signal configuration or the wireless resources configuration of the adjacent wireless nodes to be detected conflicts with the configuration for the assisted wireless access node.

In an example, in the step S11, the signal receiving level with respect to an adjacent access node is measured, and a judging step is further included between the step S11 and the step S12: judging whether the signal receiving level satisfies a predetermined condition, and in the case of satisfying the predetermined condition, reporting the working parameters of the corresponding adjacent access node to the assisted wireless access node. For example, the receiving level with respect to the synchronization signal of an adjacent access node which uses the same synchronization signal as the local access node is measured, and in the case of the receiving level being higher than the predetermined threshold, the measurement results of this synchronization signal and the measurement results of other possible synchronization signals are reported to the local access node.

The above mentioned predetermined condition can be contained in the indication about the detecting result report in the configuration information.

Figure 4:
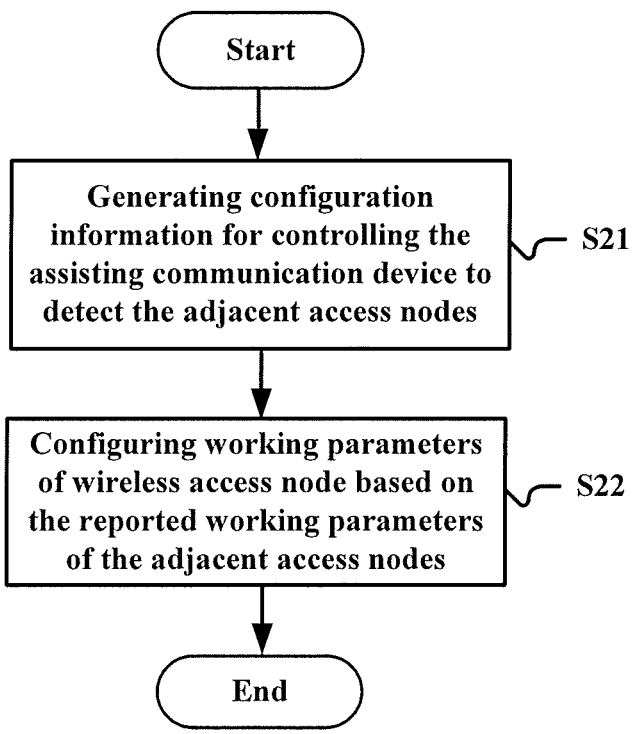
FIG. 4 is a flowchart illustrating the method for the wireless access node according to an embodiment of the present application.

FIG. 4 illustrates a flowchart of the method for a wireless access node according to an embodiment of the present application. The method includes: generating configuration information for controlling an assisting communication device of the wireless access node to detect at least one adjacent access node (S21), the configuration information comprising an indication about at least one of a detecting type, a detecting object and a detecting result report; and configuring, based on working parameters of the adjacent access nodes reported by the assisting communication device, working parameters of the wireless access node to avoid conflict with the adjacent access nodes (S22).

Wherein, the detecting type can include at least one of wireless resource detecting, reference signal detecting and synchronization signal detecting, to indicate the assisting communication device to perform corresponding detecting.

The indication about the detecting result report includes a restricting condition on a signal receiving level for the adjacent access nodes reported by the assisting communication device, and in the step S22, the adjacent access nodes reported by the assisting communication device are taken as possible conflicted adjacent access nodes. For example, when performing detecting with respect to the synchronization signal, if the signal receiving level of a synchronization signal is detected to be higher than the predetermined threshold, the adjacent access node corresponding to the synchronization signal is taken as a possible conflicted adjacent access node.

As stated above, the indication about the detecting object specifies the range of adjacent access nodes to be detected. In an example, the indication about the detecting object includes at least one of the following: identification information, synchronization signal configuration, reference signal configuration and wireless resources configuration of the adjacent wireless nodes to be detected. In particular, the synchronization signal configuration, the reference signal configuration or the wireless resources configuration of the adjacent wireless nodes to be detected may conflict with the configuration for the wireless access node.

In the step S22, at least one of the wireless resources, the reference signal and the synchronization signal of the wireless access node can be configured to be different from the corresponding working parameters of the adjacent access nodes reported by the assisting communication device. For example, in the case that the wireless access node has been working in accordance with particular working parameters and the particular working parameters conflict with the corresponding working parameters of the adjacent access nodes reported by the assisting communication device, in the step S22 the particular working parameters are changed to avoid conflict with the adjacent access nodes.

Further, transmitting of signals related to the detecting to communication devices served by the present wireless access node is stopped, when detecting the adjacent wireless access nodes, so as to avoid causing interferences to the detecting. It is also possible to transmit an indication about stopping transmitting particular signals to the communication devices served by the present wireless access node, so as to prevent the communication devices from executing incorrect measurements. On the other hand, it is also possible to notify the communication devices served by the wireless access node of the change of the working parameters before changing the particular working parameters.

It is to be noted that, the above mentioned methods can be adopted separately or in combination, the details of which have been described in detail in the first and the second embodiment and will not be repeated here.

Figure 5:
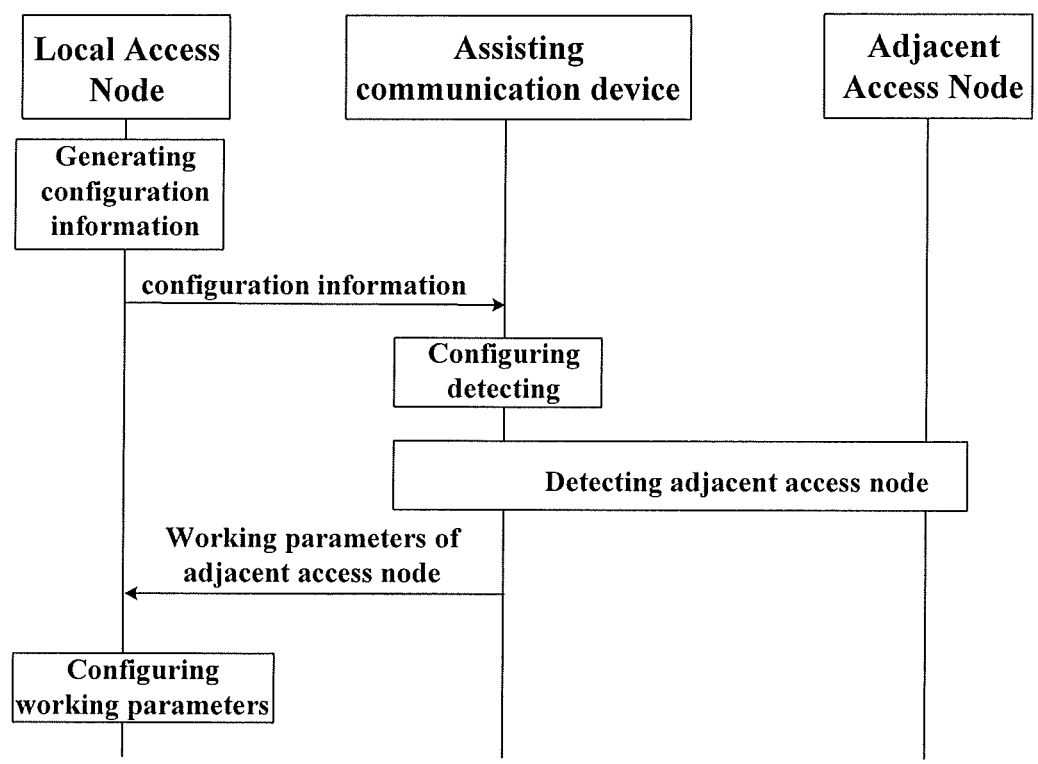
FIG. 5 illustrates a schematic diagram of an example of the information procedure for achieving indirect information interaction between access nodes using the assisting communication device.
Figure 6:
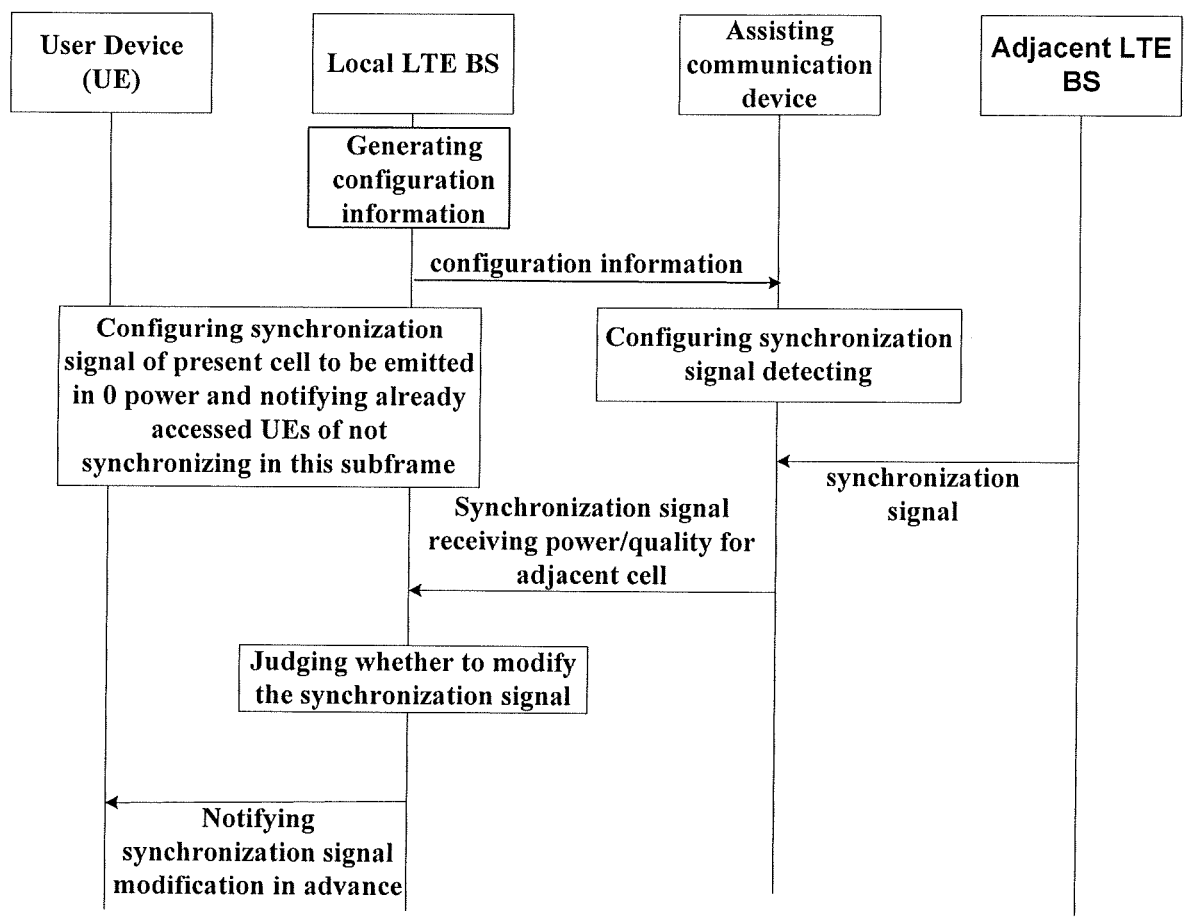
FIG. 6 illustrates a schematic diagram of another example of the information procedure for achieving indirect information interaction between access nodes using the assisting communication device.

For convenience of understanding, FIGS. 5-6 illustrate schematic diagrams of examples of the information procedure for achieving indirect information interaction between access nodes using the assisting communication device. As shown in FIG. 5, the information procedure involves respective operations of the local access node, the assisting communication device (for assisting the local access node), and the adjacent access node(s), as well as the mutual information interchange between them. Specifically, the local access node generates the configuration information for controlling the assisting communication device to detect at least one adjacent access node, the configuration information including for example an indication about at least one of a detecting type, a detecting object and a detecting result report. Then, the local access node provides the generated configuration information to the assisting communication device via a wired communication manner or a short-distance wireless communication manner, and the assisting communication device detects the adjacent access nodes to acquire the working parameters of the adjacent access nodes according to this configuration information. Subsequently, the assisting communication device reports the acquired working parameters to the local access node, thereby achieving indirect information interchange between two access nodes. The local access node can configure the working parameters of itself according to the acquired working parameters of the adjacent access nodes to avoid conflict.

As stated previously, the wireless access node and the adjacent access node herein each can be a communication device access node which provides wireless network access service to the user device in any wireless communication system. Moreover, the wireless access node and the adjacent access node can be of the same kind of communication system, and can also be of different kinds of communication systems. They can belong to the same operator, or can belong to different operators.

As an example, the present technology can be applied to the LAA scenario. In LAA, a spectrum usage scheme where the licensed frequency band and the unlicensed frequency band are both used is realized by using a carrier aggregation manner. For example, the licensed frequency band serves as the primary carrier component (PCC) to deliver the critical information and to ensure QoS, and the unlicensed frequency band serves as the secondary carrier component (SCC), which can be configured to be a downlink supplementary link or downlink and uplink, providing additional wireless resources. Since the use of the unlicensed frequency band should be kept fair, the following case is likely to occur: networks of different operators conflict with each other in the use of the same unlicensed frequency band, and information can not be interchanged effectively. In such a scenario, the local access node and the adjacent access node in FIG. 5 are a local LAA base station and an adjacent LAA base station respectively. The configuration information contains for example the indication about the wireless resources detecting, and the assisting communication device detects the adjacent LAA base station according to this indication, and for example, acquires the information about the occupation of the resources of the unlicensed frequency band by the adjacent LAA base station via an access-in manner, and provides this information to the local LAA base station. The local LAA base station determines the plan to use the unlicensed frequency band based on this information and configure the working parameters.

As another example, still taking LAA as an application scenario, when the local access node and the adjacent access node are of different kinds of communication systems, for example, the local access node is a LAA base station and the adjacent access node is a WiFi node, the information procedure of FIG. 5 can also apply. The only difference lies in that the assisting communication device accesses in the adjacent WiFi node. Exemplarily, when the assisting communication device accesses in the adjacent WiFi node, it is also possible to acquire the resources in unlicensed frequency band allocated by the WiFi node to the assisting communication device and provides the resources to the local LAA base station which in turn uses these resources to work.

In addition, in the scenario of a moving cell, i.e., the local access node continuously moving because of for example being set on a vehicle, when it enters into a new network environment, it is necessary to avoid interferences to the existing cells. At this time, the synchronization signal conflict tends to occur. FIG. 6 illustrates a schematic diagram of an example of the information procedure for avoiding the synchronization signal conflict with the adjacent access node by the assisting communication device, where the LTE system is taken as an example. It is to be understood, the information procedure of FIG. 6 is not only applicable to the scenario of a moving cell, but also applicable to the scenario of a fixed cell.

The local LTE base station (BS) generates the configuration information containing a detecting type of synchronization signal detecting, and provides the configuration information to the assisting communication device. The assisting communication device then performs synchronization signal detecting with respect to the adjacent LTE base stations. It is to be understood, as stated above, the adjacent LTE base stations serving as the detecting object can be determined based on the indication about the detecting object contained in the configuration information, and the detailed description thereof will be omitted here. In an example, the detecting of the adjacent LTE base stations by the assisting communication device simulates the cell selection and cell re-selection procedure, thereby acquiring the signal receiving level or quality for the synchronization signal of each adjacent LTE base station. The local LTE base station judges, based on the signal receiving level or quality acquired by the assisting communication device, whether conflict with the present cell occurs and thus judges whether it is necessary to modify the synchronization signal of itself. In addition, when the assisting communication device begins to detect, in order to avoid the interferences to the detecting, the local LTE base station configures the synchronization signal of the present cell to be emitted in zero power and notifies the already accessed UEs that no synchronization will be performed in this subframe. When it is judged to modify the synchronization signal, the local LTE base station notifies the already accessed UEs of this modification.

Although in the above the information procedure between the access node and the assisting communication device has been described in detail by taking the synchronization signal detecting as an example, the information procedure of FIG. 5 can be applied to cases of different detecting types, which will not be described one by one. As for the details, one can refer to the present embodiment and the related description in the first and the second embodiment.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

As can be appreciated by those skilled in the art, the modules in the above mentioned apparatus such as the adjacent access nodes information acquiring unit, the judgment unit, the assisting configuration unit, the working parameter configuration unit and so on can be implemented by one or more processors, while the modules such as the notification unit and so on can be implemented by circuit elements such as an antenna, a filter, a modem, a codec and so on.

Therefore, the present application further provides an electronic device (1), including a circuit, configured to: detect, based on configuration information from the assisted wireless access node, at least one adjacent access node, to acquire working parameters of the adjacent access nodes, the configuration information including an indication about at least one of a detecting type, a detecting object and a detecting result report; and report the acquired working parameters of the adjacent access nodes to the assisted wireless access node, to be served as a configuration reference of the wireless access node so as to avoid conflict with the adjacent access nodes.

According to another aspect of the invention, there is further provided an electronic device (2), including a circuit, configured to: generate configuration information for controlling an assisting communication device of the wireless access node to detect at least one adjacent access node, the configuration information including an indication about at least one of a detecting type, a detecting object and a detecting result report; and configure, based on working parameters of the adjacent access nodes reported by the assisting communication device, working parameters of the wireless access node to avoid conflict with the adjacent access nodes.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 700 shown in FIG. 7) from a storage medium or network, wherein the computer is capable of implementing various functions when installed with various programs.

Figure 7:
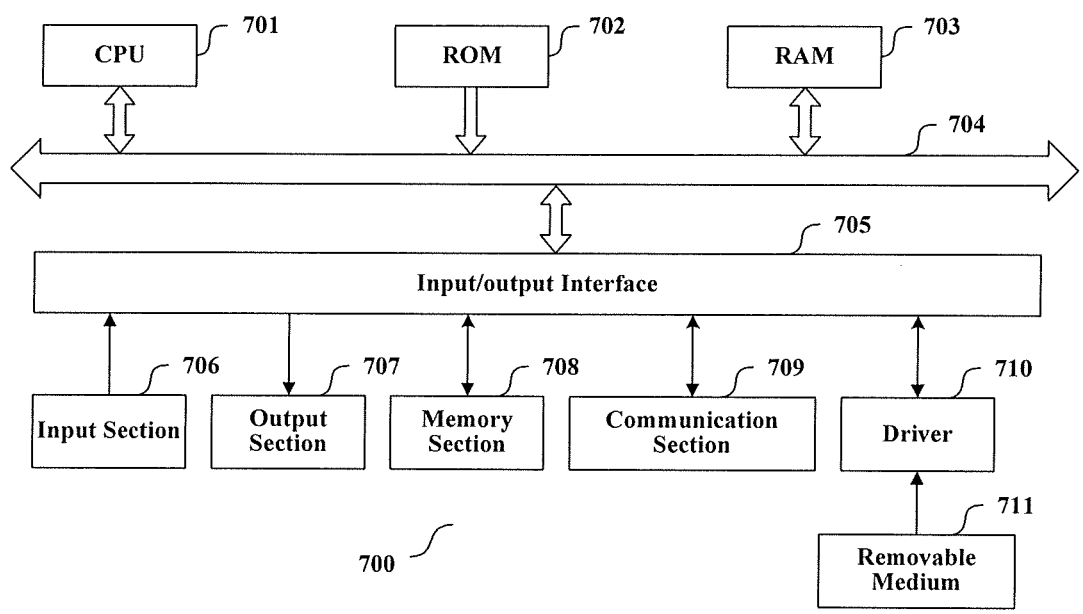
FIG. 7 is an exemplary block diagram illustrating the structure of a general purpose personal computer capable of realizing the method and/or apparatus and/or system according to the embodiments of the present invention.

In FIG. 7, a central processing unit (CPU) 701 executes various processing according to a program stored in a read-only memory (ROM) 702 or a program loaded to a random access memory (RAM) 703 from a memory section 708. The data needed for the various processing of the CPU 701 may be stored in the RAM 703 as needed. The CPU 701, the ROM 702 and the RAM 703 are linked with each other via a bus 704. An input/output interface 705 is also linked to the bus 704.

The following components are linked to the input/output interface 705: an input section 706 (including keyboard, mouse and the like), an output section 707 (including displays such as a cathode ray tube (CRT), a liquid crystal display (LCD), a loudspeaker and the like), a memory section 708 (including hard disc and the like), and a communication section 709 (including a network interface card such as a LAN card, modem and the like). The communication section 709 performs communication processing via a network such as the Internet. A driver 710 may also be linked to the input/output interface 705, if needed. If needed, a removable medium 711, for example, a magnetic disc, an optical disc, a magnetic optical disc, a semiconductor memory and the like, may be installed in the driver 710, so that the computer program read therefrom is installed in the memory section 708 as appropriate.

In the case where the foregoing series of processing is achieved through software, programs forming the software are installed from a network such as the Internet or a memory medium such as the removable medium 711.

It should be appreciated by those skilled in the art that the memory medium is not limited to the removable medium 711 shown in FIG. 7, which has program stored therein and is distributed separately from the apparatus so as to provide the programs to users. The removable medium 711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 702 and the memory section 708 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An assisting communication device, comprising:
 circuitry, configured to
 detect, based on configuration information transmitted by a wireless access node assisted by the assisting communication device upon determining that a communication quality of the wireless access node is below a predetermined threshold, at least one adjacent access node, to measure an intensity of a signal receiving level for a synchronization signal of the at least one adjacent access node and acquire working parameters of the adjacent access node, the configuration information comprising an indication about at least one of a detecting type, a detecting object and a detecting result report, the working parameters comprising the signal receiving level for the synchronization signal of the at least one adjacent access node, wherein the configuration information comprises an indication of a serial number of the synchronization signal of the wireless access node, and the serial number equals a modulo of a physical cell identification of the wireless access node;
 after measuring the intensity of the signal receiving level, judge whether the intensity of the signal receiving level satisfies a predetermined condition of the intensity by comparing the intensity of the signal receiving level to one of a threshold and intensities of other signal receiving levels; and
 in a case of satisfying the predetermined condition of the intensity, report the acquired working parameters of the adjacent access node to the wireless access node assisted by the assisting communication device, to be served as a configuration reference of the wireless access node so as to avoid conflict with the adjacent access node by making a synchronization signal of the wireless access node different from the synchronization signal of the at least one adjacent access node by changing the synchronization signal of the wireless access node to a synchronization signal with a lowest corresponding signal receiving level from among candidate synchronization signals.

2. The assisting communication device according to claim 1, wherein, the detecting type comprises wireless resource detecting, and the assisting communication device detects, in response to a wireless resource detecting indication of the wireless access node, the wireless resources occupied by the at least one adjacent access node, the wireless resources comprising at least one of a frequency band, time and a time-frequency resource block.

3. The assisting communication device according to claim 1, wherein, the detecting type comprises reference signal detecting, and the assisting communication device detects, in response to a reference signal detecting indication of the wireless access node, the reference signals emitted by the at least one adjacent access node, the reference signal comprising at least one of a cell-specific reference signal (CRS), a channel status information reference signal (CSI-RS) and a discovery reference signal (DRS).

4. The assisting communication device according to claim 1, wherein, the detecting type comprises synchronization signal detecting, and the assisting communication device detects, in response to a synchronization signal detecting indication of the wireless access node, the synchronization signals emitted by the at least one adjacent access node, the synchronization signal comprising at least one of a primary synchronization signal and a secondary synchronization signal.

5. The assisting communication device according to claim 1, wherein, the circuitry detects, based on the indication about the detecting object, particular adjacent access nodes, wherein, the indication about the detecting object comprises at least one of the following: identification information, synchronization signal configuration, reference signal configuration and wireless resources configuration of the particular adjacent access nodes to be detected.

6. The assisting communication device according to claim 5, wherein, the synchronization signal configuration, the reference signal configuration or the wireless resources configuration of the adjacent wireless nodes to be detected conflicts with the configuration for the wireless access node assisted by the assisting communication device.

7. A wireless access node, comprising:
 circuitry, configured to
 generate configuration information for controlling an assisting communication device of the wireless access node to detect at least one adjacent access node, the configuration information comprising an indication about at least one of a detecting type, a detecting object and a detecting result report;
 transmit the configuration information, if a determination is made that a communication quality of the wireless access node is below a predetermined threshold; and
 configure, based on working parameters of the at least one adjacent access node reported by the assisting communication device, working parameters of the wireless access node to avoid conflict with the at least one adjacent access node by making a synchronization signal of the wireless access node different from a synchronization signal of the at least one adjacent access node by changing the synchronization signal of the wireless access node to a synchronization signal with the lowest corresponding signal receiving level from among candidate synchronization signals, the working parameters of the at least one adjacent access node comprising an intensity of a signal receiving level for the synchronization signal of the at least one adjacent access node,
 wherein the indication about the detecting result report comprises a restricting condition on an intensity of a signal receiving level for the at least one adjacent access node reported by the assisting communication device, the restricting condition comprising a determination of whether the intensity of the signal receiving level is higher than a predetermined threshold of intensity, and the circuitry takes the at least one adjacent access node reported by the assisting communication device as at least one possible conflicted adjacent access node,
 wherein the configuration information comprises an indication of a serial number of the synchronization signal of the wireless access node, and the serial number equals a modulo of a physical cell identification of the wireless access node.

8. The wireless access node according to claim 7, wherein, the detecting type comprises at least one of wireless resource detecting, reference signal detecting and synchronization signal detecting, to indicate the assisting communication device to perform corresponding detecting.

9. The wireless access node according to claim 7, wherein, the indication about the detecting object comprises at least one of the following: identification information, synchronization signal configuration, reference signal configuration and wireless resources configuration of the adjacent wireless nodes to be detected.

10. The wireless access node according to claim 9, wherein, the synchronization signal configuration, the reference signal configuration or the wireless resources configuration of the adjacent wireless nodes to be detected conflicts with the configuration for the wireless access node.

11. The wireless access node according to claim 8, wherein, the circuitry is configured to configure at least one of the wireless resources, the reference signal and the synchronization signal of the wireless access node to be different from the corresponding working parameters of the at least one adjacent access node reported by the assisting communication device.

12. The wireless access node according to claim 8, wherein, the wireless access node stops transmitting signals related to the detecting of the assisting communication device to communication devices served by the wireless access node, when the assisting communication device detects the adjacent wireless access nodes.

13. The wireless access node according to claim 11, wherein, in the case that the wireless access node has been working in accordance with particular working parameters and the particular working parameters conflict with the corresponding working parameters of the at least one adjacent access node reported by the assisting communication device, the circuitry is configured to change the particular working parameters.

14. The wireless access node according to claim 13, wherein, the wireless access node notifies the communication devices served by the wireless access node of the change of the working parameters before changing the particular working parameters.

15. An assisting communication method, comprising:
detecting, based on configuration information transmitted by an assisted wireless access node upon determining that a communication quality of the assisted wireless access node is below a predetermined threshold, at least one adjacent access node, to measure an intensity of a signal receiving level for a synchronization signal of the at least one adjacent access node and acquire working parameters of the at least one adjacent access node, the configuration information comprising an indication about at least one of a detecting type, a detecting object and a detecting result report, the working parameters comprising the signal receiving level for the synchronization signal of the at least one adjacent access node, wherein the configuration information comprises an indication of a serial number of the synchronization signal of the assisted wireless access node, and the serial number equals a modulo of a physical cell identification of the assisted wireless access node;
after measuring the intensity of the signal receiving level, judging whether the intensity of the signal receiving level satisfies a predetermined condition of the intensity by comparing the intensity of the signal receiving level to one of a threshold and intensities of other signal receiving levels; and in a case of satisfying the predetermined condition of the intensity, reporting the acquired working parameters of the at least one adjacent access node to the assisted wireless access node, to be served as a configuration reference of the wireless access node so as to avoid conflict with the at least one adjacent access node by making a synchronization signal of the wireless access node different from the synchronization signal of the at least one adjacent access node by changing the synchronization signal of the wireless access node to a synchronization signal with a lowest corresponding signal receiving level from among candidate synchronization signals.

16. A method for a wireless access node, comprising:
generating configuration information for controlling an assisting communication device of the wireless access node to detect at least one adjacent access node, the configuration information comprising an indication about at least one of a detecting type, a detecting object and a detecting result report;
transmitting the configuration information, if a determination is made that a communication quality of the wireless access node is below a predetermined threshold; and
configuring, based on working parameters of the at least one adjacent access node reported by the assisting communication device, working parameters of the wireless access node to avoid conflict with the at least one adjacent access node by making a synchronization signal of the wireless access node different from a synchronization signal of the at least one adjacent access node by changing the synchronization signal of the wireless access node to a synchronization signal with a lowest corresponding signal receiving level from among candidate synchronization signals, the working parameters comprising an intensity of a signal receiving level for the synchronization signal of the at least one adjacent access node,
wherein the indication about the detecting result report comprises a restricting condition on an intensity of a signal receiving level for the at least one adjacent access node reported by the assisting communication device, the restricting condition comprising a determination of whether the intensity of the signal receiving level is higher than a predetermined threshold of the intensity, and the circuitry takes the at least one adjacent access node reported by the assisting communication device as at least one possible conflicted adjacent access node,
wherein the configuration information comprises an indication of a serial number of the synchronization signal of the wireless access node, and the serial number equals a modulo of a physical cell identification of the wireless access node.

17. A non-transitory computer readable storage medium, comprising machine readable program codes which when being executed on an information processing machine, allow the information processing machine to execute an assisting communication method, comprising:
detecting, based on configuration information transmitted by an assisted wireless access node upon determining that a communication quality of the assisted wireless access node is below a predetermined threshold, at least one adjacent access node, to measure an intensity of a signal receiving level for a synchronization signal of the at least one adjacent access node and acquire working parameters of the at least one adjacent access node, the configuration information comprising an indication about at least one of a detecting type, a detecting object and a detecting result report, wherein the configuration information comprises an indication of a serial number of the synchronization signal of the assisted wireless access node, and the serial number equals a modulo of a physical cell identification of the assisted wireless access node;

after measuring the intensity of the signal receiving level, judging whether the intensity of the signal receiving level satisfies a predetermined condition of the intensity by comparing the intensity of the signal receiving level to one of a threshold and intensities of other signal receiving levels; and in a case of satisfying the predetermined condition of the intensity, reporting the acquired working parameters of the at least one adjacent access node to the assisted wireless access node, to be served as a configuration reference of the wireless access node so as to avoid conflict with the at least one adjacent access node by making a synchronization signal of the wireless access node different from the synchronization signal of the at least one adjacent access node by changing the synchronization signal of the wireless access node to a synchronization signal with a lowest corresponding signal receiving level from among candidate synchronization signals, the working parameters comprising a signal receiving level for the synchronization signal of the at least one adjacent access node.

18. A non-transitory computer readable storage medium, comprising machine readable program codes which when being executed on an information processing machine, allow the information processing machine to execute a method for a wireless access node, comprising:

generating configuration information for controlling an assisting communication device of the wireless access node to detect at least one adjacent access node, the configuration information comprising an indication about at least one of a detecting type, a detecting object and a detecting result report;

transmitting the configuration information, if a determination is made that a communication quality of the wireless access node is below a predetermined threshold; and configuring, based on working parameters of the at least one adjacent access node reported by the assisting communication device, working parameters of the wireless access node to avoid conflict with the at least one adjacent access node by making a synchronization signal of the wireless access node different from a synchronization signal of the at least one adjacent access node by changing the synchronization signal of the wireless access node to a synchronization signal with a lowest corresponding signal receiving level from among candidate synchronization signals, the working parameters comprising an intensity of a signal receiving level for the synchronization signal of the at least one adjacent access node, wherein the indication about the detecting result report comprises a restricting condition on a signal receiving level for the at least one adjacent access node reported by the assisting communication device, the restricting condition comprising a determination of whether the intensity of the signal receiving level is higher than a predetermined threshold of intensity, and the circuitry takes the at least one adjacent access node reported by the assisting communication device as at least one possible conflicted adjacent access node, wherein the configuration information comprises an indication of a serial number of the synchronization signal of the wireless access node, and the serial number equals a modulo of a physical cell identification of the wireless access node.

* * * * *